United States Patent [19]

Hsu

[11] Patent Number: 4,526,937
[45] Date of Patent: Jul. 2, 1985

[54] POLYCARBONATES HAVING PLASTICIZERS WITH FUGITIVE ACTIVITY

[75] Inventor: Chin C. Hsu, Avon Lake, Ohio

[73] Assignee: The B. F. Goodrich Company, Akron, Ohio

[21] Appl. No.: 622,620

[22] Filed: Jun. 20, 1984

Related U.S. Application Data

[63] Continuation-in-part of Ser. No. 528,313, Aug. 31, 1983, abandoned.

[51] Int. Cl.³ .................. C08F 2/08; C08F 22/02; C08F 20/06; C08F 120/06
[52] U.S. Cl. .................. 524/724; 524/762; 524/853; 524/854; 526/209; 526/238.23; 526/317
[58] Field of Search ............ 526/209, 238.23, 317; 524/762, 724, 853, 854

[56] References Cited

U.S. PATENT DOCUMENTS 4,487,899 12/1984 White .................. 526/209

Primary Examiner—C. Warren Ivy
Attorney, Agent, or Firm—George A. Kap; Alan A. Csontos

[57] ABSTRACT

A process for polymerizing olefinically unsaturated carboxylic acids containing at least one activated carbon-to-carbon olefinic double bond and at least one carboxyl group in benzene in the presence of block copolymers of propylene oxide and ethylene oxides having molecular weights in the range of greater than about 1600 to about 20,000, resulting in improved yields of carboxyl-containing polymers, such as cross-linked polyacrylic acid as shown by an increase in total solids of the benzene slurry of about 50 percent, the polymers obtained at this higher total solids having increased bulk density.

18 Claims, No Drawings

POLYCARBONATES HAVING PLASTICIZERS WITH FUGITIVE ACTIVITY

CROSS REFERENCE TO RELATED APPLICATION

This application is continuation-in-part of application entitled "Preparation of Carboxyl Containing Polymers" filed Aug 31, 1983 and bearing Ser. No. 528,313, now abandoned.

BACKGROUND OF THE INVENTION

Carboxyl containing polymers, homopolymers, or copolymers with other vinylidene monomers, of unsaturated polymerizable carboxylic acids such as acrylic acid, methacrylic acid, maleic acid, itaconic acid and the like, are useful thickening agents. These polymer acids often are cross-linked with small amounts of cross-linking agents. These materials are usually prepared by polymerization of the acid with a free radical catalyst in an organic medium in a closed vessel with stirring. During the course of such polymerizations, shortly after initiation of polymerization, polymer begins to precipitate from the solution as it is formed and flocculates and forms aggregates. The precipitated polymer forms a slurry in the solvent which often becomes extremely thick and results in ineffective mixing, poor heat transfer, and limits the total solids, i.e., polymer yield, that can be obtained in production equipment. The total solids of such slurries usually is in the range of about 8 to 17 weight percent. Higher yields are desirable.

U.S. Pat. No. 4,375,533 discloses a method for polymerizing olefinically unsaturated carboxylic acids in an organic media in the presence of a catalyst and a surface active agent having an HLB value of less than 10 to reduce the polymer build-up, improve heat transfer, and provide products having improved drying properties and less residual solvent in the dry polymer. However, polymerizations in benzene are generally limited to lower total solids slurries to avoid high slurry viscosity because of excessive flocculation.

SUMMARY OF THE INVENTION

A novel process for preparing carboxyl-containing hydrogel polymers in improved yields in an organic liquid is realized when such polymerizations are conducted in the presence of less than 10 weight parts, per 100 weight parts of monomers being polymerized, of block polymers of propylene oxide and ethylene oxide that have molecular weights in the range of about 1500 to about 20,000, resulting in increased reactor output capability on a commercial scale of about a 50% increase in products obtained per reactor.

DETAILED DESCRIPTION

In accordance with the novel and improved process of this invention, one is able to obtain as high as a 50 weight percent increase in reactor output, as measured by increased polymer slurry total solids, resulting in increased carboxyl-containing polymer production per production reactor, without adversely affecting the physical properties and characteristics of the carboxyl-containing polymers. Use of the defined block copolymers minimizes undesirable flocculation and agglomeration, thus allowing the polymerizations to be carried out to substantially higher polymer solids levels. This effectively increases the plant capacity of existing facilities and represents a substantial cost savings. One unexpected advantage of the higher total solids slurries of this process is an increase in the bulk density in the range of about 12 to 16 pounds per cubic foot, of the resulting carboxyl-containing polymers, as compared to lower total solids slurry polymers prepared in the absence of the block copolymers of propylene oxide and ethylene oxide. This is a desirable advantage since a denser product results in a savings in packaging and transportation costs. Total solids of polymer slurries as high as about 50 weight percent polymer in organic liquids, such as benzene, may be obtained by using sufficient block polymer during the polymerization.

Polymerization of the carboxyl-containing monomers, optionally with other vinylidene comonomers, is usually carried out in the presence of a free radical catalyst in a closed vessel in an inert atmosphere under autogenous or artificially-induced pressure, or in an open vessel in an inert atmosphere under reflux at atmospheric pressure. Temperature of the polymerization may be varied from about 0° to 125° C. or lower or higher. Polymerization at 25° to 90° C. using a free radical catalyst is generally effective in providing monomer to polymer conversions of 75 percent to 100 percent.

In the practice of the invention, the polymerizations may be either batch, semi-batch or continuous. The agitation may be any agitation sufficient to maintain the slurry and obtain effective heat transfer including, for example, helical agitation, pitched turbines and the like. A useful reaction temperature range is from the range of 20° C. to 90° C. at about 1 atmosphere or more. Normal polymerization time is from about 3 to 12 hours.

Typical free-radical forming catalysts include peroxygen compounds such as sodium, potassium and ammonium persulfates, caprylyl peroxide, benzoyl peroxide, hydrogen peroxide, pelargonyl peroxide, cumene hydroperoxides, diisopropyl hydroperoxide, tertiary butyl diperphthalate, tertiary butyl perbenzoate, sodium peracetate, di-(2-ethylhexyl) peroxy dicarbonate, and the like, as well as azo catalysts such as azodiisobutyryl nitrile. Other catalysts utilizable are the so-called "redox" type of catalyst and the heavy-metal activated catalyst systems. Ultraviolet light may also be used as a source of free radicals. Some systems polymerize solely by heat, but catalysts generally provide better control. The monomers may be batch charged or continuously added during the course of polymerization or by any other manner of polymerization techniques conventionally used.

The polymerization reactions described herein are normally conducted in inert diluents that have solubilizing effect on one or more of the monomeric ingredients but substantially none on the resulting polymers. Stated differently, the medium used for the polymerization is a non-polar organic fluid in which the monomers are preferably soluble but in which the polymer is substantially insoluble. Such materials are normally organic liquids, and mixtures thereof, which are solvents for the monomers but nonsolvents for the resulting polymers so that the polymer product is preferably obtained as a fine friable or fluffy precipitate. Typical solvents include liquid hydrocarbons selected from alkanes of 5 to 10, preferably 6 to 8 carbon atoms, such as hexane and heptane; cycloalkanes of 4 to 8, preferably 5 to 7 carbon atoms, such as cyclohexane; benzene and alkyl-substituted benzenes containing 1 to 2 lower alkyl substituents, preferably methyl substituents, such as toluene and xylene; alkyl carboxylates containing 1 to 6 preferably 1 to 4 carbon atoms in the alkyl groups and 2 to 6, preferably 2 to 4 carbon atoms in the carboxylate moiety, such as ethyl acetate, methyl acetate, and butyl acetate; haloalkanes, especially chlorofluoroalkanes, containing 1 to 2 carbon atoms and at least 2 halo groups, such as methylene chloride, ethylene dichloride, and 1,1,1-trichloroethane; and mineral spirits with a flash point greater than about 50° C. containing 0–2% aromatics, 40–85% parafins, and 15–50% napthenes. Methyl ethyl ketone, a polar solvent, was found to be unsuitable in the context of this invention.

The amount of organic liquid solvent, such as benzene, used normally will be in excess of the monomers to be polymerized and the proportion may vary from at least 1 weight percent of monomers and 99 percent solvent up to about 50 weight percent monomers and 50 weight percent solvent, more normally a concentration of about 10 to 35 percent organic monomers is employed.

The carboxyl containing polymers are prepared from vinylidene monomers containing at least one activated $>C=C<$ group and carboxyl group. Such polymers are homopolymers of an unsaturated, polymerizable carboxylic monomers such as acrylic acid, methacrylic acid, maleic acid, itaconic acid and the like, or copolymers thereof. The carboxyl containing polymers have molecular weights greater than about 500 to as high as several million, usually greater than about 10,000 to 900,000 or more.

Typical materials are those described in U.S. Pat. No. 2,798,053. Copolymers, for example, include copolymers of acrylic acid with small amounts of polyalkylenyl polyether cross-linkers that are gel-like polymers, which, especially in the form of their salts, absorb large quantities of water or solvents with subsequent substantial increase in volume. Other useful carboxyl containing polymers are described in U.S. Pat. No. 3,940,351, directed to polymers of unsaturated carboxylic acid and at least one alkyl acrylic or methacrylic ester where the alkyl group contains 10 to 30 carbon atoms. Other types of such copolymers are described in U.S. Pat. No. 4,062,817 wherein the polymers described in U.S. Pat. No. 3,940,351 contain additionally another alkyl acrylic or methacrylic ester and the alkyl groups contain 1 to 8 carbon atoms. Carboxylic polymers and copolymers such as those of acrylic acid and methacrylic acid also may be cross-linked with polyfunctional materials as divinyl benzene, unsaturated diesters and the like, as is disclosed in U.S. Pat. Nos. 2,340,110; 2,340,111; and 2,533,635.

The carboxylic monomers are the olefinically-unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl group, $—C=C—COOH$; or as part of a terminal methylene grouping $CH_2=C<$. Olefinically-unsaturated acids of this class include such materials as the acrylic acids typified by the acrylic acid itself, alpha-cyano acrylic acid, beta methylacrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-stearyl acid (1-carboxy-4-phenyl butadiene-1,3), itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure

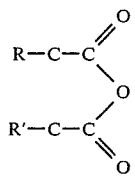

wherein R and R' are selected from the group consisting of hydrogen, halogen and cyanogen ($—C=N$) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers are the mono-olefinic acrylic acids having the general structure

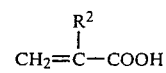

wherein $R^2$ is a substituent selected from the class consisting of hydrogen, halogen, and the cyanogen ($—C=N$) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred. Another useful carboxylic monomer is maleic anhydride or the acid.

The polymers include both homopolymers of carboxylic acids or anhydrides thereof, or the defined carboxylic acids copolymerized with one or more other vinylidene monomers containing at least one terminal $>CH_2$ group. Such monomers include, for example, acrylate ester monomers including those acrylic acid ester monomers such as derivatives of an acrylic acid represented by the formula

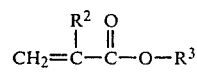

wherein $R^3$ is an alkyl group having from 1 to 30 carbon atoms, preferably 1 to 20 carbon atoms and $R^2$ is hydrogen, methyl or ethyl, present in the copolymer in amount, for example, from about 1 to 40 weight percent or more. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl methacrylate, nonyl acrylate, hexyl acrylate, n-hexyl methacrylate, and the like; higher alkyl acrylic esters are decyl acrylate, isodecyl methacrylate, lauryl acrylate, stearyl acrylate, behenyl acrylate and melissyl acrylate and the corresponding methacrylates. Mixture of two or three or more long chain acrylic esters may be successfully polymerized with one of the carboxylic monomers.

The polymers also may be cross-linked with any poly-functional vinylidene monomer containing at least 2 terminal $CH_2<$ groups, including for example, butadiene, isoprene, divinyl benzene, divinyl naphthlene, allyl acrylates and the like. Particularly useful cross-linking monomers for use in preparing the copolymers are polyalkenyl polyethers having more than one alkenyl ether grouping per molecule. The most useful possess alkenyl groups in which an olefinic double bond is present attached to a terminal methylene grouping, $CH_2=C<$. They are made by the etherification of a polyhydric alcohol containing at least 3 carbon atoms and at least 2 hydroxyl groups. Compounds of this class may be produced by reacting an alkenyl halide, such as allyl chloride or allyl bromide, with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers include for example, diallyl esters, dimethallyl ethers, allyl or methallyl acrylates and acrylamides, tetraallyl tin, tetravinyl silane, polyalkenyl methanes, diacrylates, and dimethacrylates, divinyl compounds such as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, trimethylolpropane diallyl ether, pentaerythritol triacrylate, tetramethylene dimethacrylate, ethylene diacrylate, ethylene dimethacrylate, triethylene glycol dimethacrylate, and the like. Allyl pentaerythritol, trimethylolpropane diallylether and allyl sucrose provide excellent polymers. When the cross-linking agent is present, the polymeric mixtures usually contain up to about 5% or more by weight of cross-linking monomer based on the total of carboxylic acid monomer, plus other monomers, if present, and more preferably about 0.01 to 2.0 weight percent.

Other vinylidene monomers may also be used, including the acrylic nitriles, $\alpha$, $\beta$-olefinically unsaturated nitriles useful are preferably the monoolefinically unsaturated nitriles having from 3 to 10 carbon atoms such as acrylonitrile, methacrylonitrile, and the like. Most preferred are acrylonitrile and methacrylonitrile. The amounts used are, for example, for some polymers are from about 1 to 30 weight percent of the total monomers copolymerized. Acrylic amides including monoolefinically unsaturated amides also may be used. These have at least one hydrogen on the amide nitrogen and the olefinic unsaturation is alpha-beta to the carbonyl group. Representative amides include acrylamide, methacrylamide, N-t-butyl acrylamide, N-cyclohexyl acrylamide, and others. Preferred are acrylamide and methacrylamide. Other acrylic amides include N-alkylol amides of alpha, beta-olefinically unsaturated carboxylic acids including those having from 4 to 10 carbon atoms such as N-methylol acrylamide, N-propanol acrylamide, N-methylol methacrylamide, N-methylol maleimide, N-methylol maleamic acid esters, the N-alkylol amides of the vinyl aromatic acids such as N-methylol-p-vinyl benzamide, and the like. $\alpha$-olefins containing from 2 to 12 carbon atoms, more preferably from 2 to 8 carbon atoms; dienes containing from 4 to 10 carbon atoms; vinyl esters and allyl esters such as vinyl acetate; vinyl aromatics such as styrene, methyl styrene, chloro-styrene; vinyl and allyl ethers and ketones such as vinyl methyl ether and methyl vinyl ketone; chloroacrylates, cyanoalkyl acrylates such as $\alpha$-cyanomethyl acrylate, the $\alpha$-, $\beta$- and $\gamma$- cyanopropyl acrylate; alkoxyacrylates such as methoxy ethyl acrylate; haloacrylates as chloroethyl acrylate; vinyl halides and vinyl chloride, vinylidene chloride and the like; divinyls, diacrylates and other polyfunctional monomers such as divinyl ether, diethylene glycol diacrylate, ethylene glycol dimethacrylate, methylene-bis-acrylamide, allylpentaerythritol, and the like; and bis ($\beta$-haloalkyl) alkenyl phosphonates such as bis($\beta$-chloroethyl) vinyl phosphonate and the like as are known to those skilled in the art. Copolymers wherein the carboxy containing monomer as a minor constituent, and the other vinylidene monomers present as major components are readily prepared in accordance with the process of this invention.

These copolymers may include as little as 8 weight percent of the total polymer of a carboxyl containing monomer, up to 100 percent, i.e. homopolymer. Particularly useful copolymers contain greater than 40 percent acid and preferably greater than 70 weight percent acid.

The block copolymers of propylene oxide and ethylene oxide are linear or branched. The linear copolymers are readily prepared by the sequential addition of propylene oxide and ethylene oxide to a propylene glycol base. These materials have the general structure

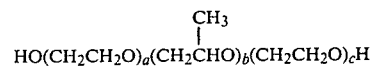

$$HO(CH_2CH_2O)_a(CH_2CHO)_b(CH_2CH_2O)_cH$$

wherein a, b, and c are integers relating to the molecular weight and propylene oxide and ethylene oxide content of the molecule. The branched block copolymers are generally prepared by the sequential addition of propylene oxide and ethylene oxide to a triol, an aliphatic alcohol containing three hydroxyl groups such as trimethylolpropane. The tetrafunctional materials are prepared by sequential additions of propylene oxide and ethylene oxide to ethylene diamine.

Block copolymers of propylene oxide and ethylene oxide are commercially available as PLURONIC, PLURADOT, and TETRONIC polyols (BASF Wyandotte Corporation), the Pluronic materials are linear block copolymers, the Pluradot materials are trifunctional liquid polyethers based on alkoxylated (polyoxyethylene and polyoxypropylene) triols, and the Tetronic polyols, tetrafunctional polyoxyethylene-polyoxypropylene polyols, are prepared by the tetraaddition of propylene oxide and ethylene oxide sequentially to ethylene diamine.

The block copolymers useful in the practice of this invention have molecular weights in the range of greater than about 1600, as 2000, to about 20,000. Excellent results have been obtained with linear block copolymers having molecular weights in the range of about 2500 to about 14,500. Good results have also been obtained with branched block copolymers having molecular weights of about 3000 to about 7500. The polyoxyethylene content of the block copolymers is from about 10 weight percent to about 80 weight percent. Excellent results have been observed with block copolymers containing 10 to 80 weight percent polyoxyethylene units. The amounts of the block copolymers used in the polymerization process is greater than about 0.5 to less than 10 weight parts per 100 weight parts of carboxyl containing polymer formed, more preferably, from about 0.5 to about 5 weight parts of block copolymer per 100 weight parts of monomers being polymerized.

It was found, quite unexpectedly, that while the block copolymers described above, and which may be designated as polyoxyethylene-polyoxypropylene-polyoxyethylene block polymers, provide the desired advantages of this invention, that the so-called reverse block copolymers were not as effective for the purposes of this invention. That is, the copolymers that are designated polyoxypropylene-polyoxyethylene-polyoxypropylene, (POP-POE-POP) are not as effective as the POE-POP-POE polymers in the presence of this invention. Further, in a solvent such as benzene, the HLB values of the defined block copolymers does not appear to be a factor in effectiveness in accordance with the process. Block copolymers of propylene oxide with ethylene oxide having HLB values of 1 to 29, but not the defined and critical molecular weights, are unsatisfactory in the process of this invention; while block copolymers having molecular weights in the required range and having HLB values of 1 and 29 all were satisfactory.

The following examples are presented for the purpose of demonstrating certain features of the invention disclosed herein which are considered to impart significant advantages.

EXAMPLE I

This example demonstrates preparation of a homopolymer of acrylic acid in methylene chloride solvent in absence of a block copolymer of ethylene oxide and propylene oxide. Since preparation of polyacrylic acid herein is carried out in absence of the block copolymer, this example does not form a part of the invention claimed herein.

Pursuant to conventional procedure, 93 weight parts of methylene chloride, 7 weight parts of acrylic acid, 0.077 weight parts of allyl pentaerythritol, and 0.042 weight parts of di-(2-ethylhexyl) peroxy dicarbonate were charged to a 2-liter reactor and polymerized at 40° C. for six hours. The resulting slurry was very thick but the polymer was recoverable with difficulty. The 7 weight percent of monomer was considered to be the highest concentration for this polymerization process to afford a reasonably recoverable product.

EXAMPLE II

This example demonstrates polymerization of acrylic acid in the presence of methylene chloride solvent and the trifunctional block copolymer polyoxyethylene-polyoxypropylene polyol that has molecular weight of 3200 and is identified as BASF Pluradot HA-410, without which copolymer the polymerization reaction would not be possible.

In accordance with the invention disclosed herein, 90 weight parts of methylene chloride, 10 weight parts of acrylic acid, 0.11 weight parts of allyl pentaerythritol, 0.06 weight part of di-(2-ethylhexyl) peroxy dicarbonate, and 0.05 weight part of the trifunctional polyoxyethylene-polyoxypropylene polyol block copolymer were polymerized at 40° C. for six hours. The resulting slurry was thick but the product was recoverable. This polymerization would not have been possible to control without the presence of the block copolymer as dispersant.

EXAMPLE III

This example demonstrates preparation of polyacrylic acid in 1,1,1-trichloroethane solvent and in the absence and in the presence of polyoxyethylene-polyoxypropylene block copolymer having molecular weight of 2900 and identified as BASF Pluronic L-64, to show the effect of the block copolymer on slurry viscosity.

Pursuant to the invention disclosed herein, 8.13 weight parts of acrylic acid, 91.87 weight parts of 1,1,1-trichloroethane, 0.055 weight part of allyl pentaerythritol, and 0.055 weight part of lauroyl peroxide were polymerized at 74° C. for six hours. The resultant slurry viscosity was 482 centipoise at 25° C. measured with a LVT model Brookfield viscometer at 60 rpm. In a second polymerization, the same recipe was charged plus 0.24 weight part of the polyoxyethylene-polyoxypropylene polyol block copolymer identified above. The resulting slurry viscosity was 115 centipoise at 25° C. measured the same way.

The reduction in slurry viscosity with the use of the block copolymer shows the effectiveness of the dispersant as steric stabilizer for the polymerization of acrylic acid in 1,1,1-trichloroethane.

EXAMPLE IV

Similarly to the preceding example, polymerization of acrylic acid was conducted in 1,2-ethylene dichloride solvent in the absence and in the presence of polyoxyethylene-polypropylene block copolymer having molecular weight of 2900 and identified as BASF Pluronic L-64, to show the effect of the block copolymer on slurry viscosity.

Pursuant to the invention disclosed herein, 8.53 weight parts of acrylic acid, 91.47 weight parts of 1,2-ethylene dichloride, 0.055 weight part of allyl pentaerythritol and 0.055 weight part of lauroyl peroxide were polymerized at 80° C. for six hours. The resultant slurry viscosity was 170 centipoise at 25° C. The same recipe plus 0.24 weight of part of the block copolymer identified above, resulted in a slurry viscosity of 90 centipoise at 25° C.

Again, this demonstrates the effectiveness of the block copolymer as steric stabilizer in the non-aqueous dispersion polymerization of acrylic acid in 1,2-ethylene dichloride.

To further demonstrate the practice of this invention and advantages thereof, additional polymerizations to 25 weight percent total solids of slurries were conducted. The reactor used was a jacketed reactor equipped with a reflux condensor, agitator and heating-cooling means. Temperatures in the reactor, jacket outlet and heating bath were recorded by a strip chart recorder. Temperature control was accomplished by adjusting the bath temperature or by circulating water through the reactor jacket. The following formulation was used:

| Polymerization Recipe | |
|---|---|
| Materials | Weight Parts |
| Acrylic acid | 100.0 |
| Benzene | 300.0 |
| Lauroyl peroxide | |
| first addition | 0.11 |
| second addition | 0.07 |

-continued

| Polymerization Recipe | |
|---|---|
| Materials | Weight Parts |
| Allyl pentaerythritol | 0.68 |
| Block Copolymer | 1–3.0 |

The reactor was purged with nitrogen, and a nitrogen stream to the reactor was maintained throughout the course of the reaction. 0.18 weight part of lauroyl peroxide was dissolved in 20 weight parts of benzene and reserved. The remainder of the benzene, acrylic acid, allyl pentaerythritol and the block copolymer were added to the reactor (1 to 3 weight parts of the block copolymer in 20 weight parts of benzene). The reactor contents were heated to 70° C. with the agitator on. The first addition of lauroyl peroxide was made, and when the reaction mixture temperature reached 80.5° C., this temperature was maintained for the remainder of the reactions, unless the slurry viscosity exceeded the paste stage, and at this point the temperature would be lowered to 70°–72° C. The second addition of lauroyl peroxide was made after 60 minutes, and the reaction allowed to continue for four hours. At the fifth hour, the reactor was cooled to 25° C. A sample was taken for slurry viscosity measurements, using a Brookfield viscometer, Model LVT at 60 rpm with a Number 3 spindle. The slurry was transferred to another vessel and dried under 27 inches Hg. vacuum for five hours at 110° C. using a rotary evaporator to provide a dry powder of the crosslinked acrylic acid copolymer hydrogel.

EXAMPLE V

A series of polymerization reactions were run with different molecular weight linear polyoxyethylene-polyoxypropylene-polyoxyethylene block copolymers, and the viscosity of the resulting polymer slurries determined, demonstrating the advantages of using the block copolymers for the polymerization of carboxyl containing monomers to polymers in benzene, to obtain improved total solids slurries that still could be processed in the reactor and thereafter. All of the polymerizations were conducted to a 25 weight percent polymer solids content, and the viscosities of the slurries are reported in centipoises. Run (1) was made with an alkoxylated (polyoxyethylene-polyoxypropylene)triol and Runs (2) through (12) with a linear polyoxyethylene-polyoxypropylene-polyoxyethylene copolymer.

TABLE I

| Block Copolymer | Weight Parts Block Copolymer mol. wt. | |
|---|---|---|
| Run No. Mol. weight | 1.0 | 3.0 Viscosities, cps |
| (1) 7500 | 145/460 | 360 |
| (2) 3800 | 420 | 380/410/640 |
| (3) 4950 | 440 | 520 |
| (4) 6500 | — | 560 |
| (5) 3650 | — | 320 |
| (6) 5100 | 1360 | 330 |
| (7) 4200 | 1100 | — |
| (8) 2750 | 920 | 180 |
| (9) 2500 | 580 | 440 |
| (10) 8350 | 280 | 120 |
| (11) 3200 | 820 | — |
| (12) 14500 | — | 320 |

Desirable control of flocculation and minimization of flocculation is obtained and observed in these examples. With 5 weight parts of the first block polymer (1), the slurry viscosity at the end of the polymerization reaction was 230 cps. In a control not containing any block copolymer, the reaction to reach 25% total solid could not be completed, the slurry becoming so thick and viscous at a total solids of less than 20% that it could not be stirred and temperature control was lost. Only with the block copolymers was it possible to obtain 25 or higher weight percent total solids in benzene and maintain a handleable reaction and slurry. Block copolymers having molecular weights of 1100 and 1630 are not very effective in this process. Block polymers of ethylenediamine to which propylene oxide and ethylene oxide were added sequentially (Tetronic R polyols) having molecular weights greater than 2700 were satisfactory in the above polymerizations only at higher levels. It was found that the reverse linear block copolymer POP-POE-POP could not be used to replace POE-POP-POE block copolymers of this invention because they were not as effective at these concentrations. While some of the defined block polymers may not be completely satisfactory at low levels, they may be used at higher levels, and/or at lower polymer total solids levels.

EXAMPLE VI

A series of polymerizations was run to demonstrate the properties of the carboxyl-containing polymers obtained at 25% total solids levels with a variety of block copolymers. Mucilage viscosities in centipoises, of the various polymers prepared with different block polymers, was determined by taking dry polymer samples and making 0.2, 0.5 and 1.0 weight percent mucilages. The polymers were dissolved in water in the amounts indicated, adjusting the pH of the solutions to 7.2 and 7.8 with a 18% aqueous solution of sodium hydroxide. The viscosities of the resulting mucilages were determined with the Brookfield viscometer model RVT at 20 rpm and reported in centipoises (cps).

TABLE II

| Block Copolymer | | | Mucilage Viscosity (cps) | | | Bulk |
|---|---|---|---|---|---|---|
| Run No. | Mol. Wt. | % POE[1] | Wt. Pts. | 0.2% | 0.5% | 1.0% | Density lbs./ft.$^3$ |
| (13)[2] | — | — | 0 | 23,000 | 45,000 | 65,000 | 10 |
| (14) | 3800 | 10 | 1 | 32,000 | 104,000 | 124,000 | 13.5 |
| (15) | | | 3 | 20,000 | 68,000 | 102,000 | 12.1 |
| (16) | 3650 | 20 | 1 | 27,000 | 72,000 | 128,000 | 12.4 |
| (17) | | | 3 | 30,000 | 56,000 | 78,000 | 15.2 |
| (18) | 8350 | 80 | 1 | 20,000 | 90,000 | 130,000 | 14.9 |
| (19) | | | 3 | 10,000 | 52,000 | 102,000 | 15.3 |
| (20) | 2900 | 40 | 1 | 28,000 | 80,000 | 128,000 | 15.1 |
| (21) | | | 3 | 16,000 | 56,000 | 94,000 | 15.1 |
| (22) | 2500 | 20 | 1 | 23,000 | 82,000 | 118,000 | 16.5 |
| (23) | | | 3 | 30,000 | 64,000 | 84,000 | 15.1 |
| (24) | 13500 | 80 | 3 | 22,000 | 62,000 | 108,000 | 14.6 |

[1]Polyoxyethylene units of polyoxyethylene-polyoxypropylene-polyoxyethylene copolymers.
[2]Charge ran at 17% total solids.

These data demonstrate the desirably higher bulk density obtained when the defined block copolymers are used. As has been seen, viscosities of aqueous mucilages of polymers prepared in accordance with the defined process are not significantly affected by use of the block copolymers during the polymerization step. At higher levels of block copolymers, some foaminess may be observed in specific formulations but any such foaming is at a manageable level. When this Example was repeated with 5 parts of a tetrafunctional polyoxypropylene-polyoxyethylene derivative of ethylene diamine containing 40% polyoxyethylene units, the viscosities obtained were 0.2%–15,000; 0.5%–16,000, and 1.0%–20,000.

The carboxyl containing polymers produced by the process of this invention find many uses, particularly as bodying, thickening and suspending agents in various mucilagenous and colloidal gel-like applications in cosmetic preparations; pharmaceuticals including, for example, dentrifices, surgical jellies, creams, ointments, and bulk laxatives; food preparations; in thickening latexes; in printing paste formulations; oil well drilling muds, and in other applications where ion-insensitive polymers are required.

I claim:

1. A process comprising polymerizing olefinically unsaturated carboxylic acids containing at least one activated carbon-to-carbon olefinic double bond and at least one carboxyl group in the presence of 50 to 99 weight percent of a solvent selected from organic liquids and mixtures thereof in which said carboxylic acids are at least partially soluble and in which the resulting polymers are substantially insoluble, a free radical forming catalyst, and greater than 0.5 to less than 10 weight parts per 100 weight parts of carboxyl containing polymers formed of hydroxyl terminated polyoxyethylene-polypropylene-polyoxyethylene block copolymers of propylene oxide and ethylene oxide having HLB above 10 and molecular weights in the range of about 2500 to about 20,000 and containing from about 10 to about 80 weight percent of polyoxyethylene units, to form a polymer containing about 40 to 100 weight percent of said unsaturated carboxylic acid.

2. A process of claim 1 wherein in said carboxylic acid the olefinic double bond is in the alpha-beta position with respect to a carboxyl group or is part of a terminal methylene group.

3. A process of claim 2 wherein said carboxylic acid is selected from the group consisting of acrylic acid, methacrylic acid, and maleic acid.

4. A process of claim 3 wherein said carboxylic acid is acrylic acid present in amounts of greater than 40 weight percent and from 0 to 60 weight percent of at least one other olefinically unsaturated monomer containing at least one $CH_2=C<$ group is copolymerized therewith.

5. A process of claim 4 wherein said acrylic acid is present in amounts greater than 70 weight percent and there is present less than 5 weight percent of a polyfunctional cross-linking olefinically unsaturated monomer containing at least two terminal $CH_2<$ groups.

6. A process of claim 3 wherein the block copolymer is a linear copolymer, the molecular weight is from about 2500 to about 14,500, and the solvent is selected from benzene, haloalkanes containing 1 to 2 carbon atoms and at least 2 halogens, and alkanes of 6 to 8 carbon atoms.

7. A process of claim 5 wherein the block copolymer is a linear copolymer, the molecular weight is from 2500 to about 14,500.

8. A process of claim 3 wherein the block copolymer is a trifunctional polyoxyethylene-polyoxypropylene triol copolymer and the molecular weight is from 3000 to about 8000.

9. A process of claim 5 wherein the block copolymer is a trifunctional polyoxyethylene-polyoxypropylene triol copolymer and the molecular weight is from 3000 to 8000.

10. A process of claim 3 wherein the block copolymer is a tetrafunctional polyoxyethylene-polyoxypropylene copolymer and the molecular weight is from 3000 to about 7,500.

11. A process of claim 5 wherein the block copolymer is a tetrafunctional polyoxyethylene-polyoxypropylene ethylene diamine copolymer and the molecular weight is from 3,000 to 7,500.

12. A process of claim 7 wherein said crosslinking agent is selected from the group consisting of polyallyl pentaerythritol, polyallyl sucrose and trimethylolpropane diallylether.

13. A process of claim 12 wherein there is present less than 30 weight percent of an acrylic acid ester of the formula

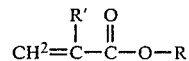

wherein R' is hydrogen, methyl or ethyl and R is an alkyl group containing 1 to 30 carbon atoms.

14. A method of claim 13 wherein R' is hydrogen or methyl and R is an alkyl group containing 2 to 20 carbon atoms.

15. A process of claim 8 wherein said crosslinking agent is selected from the group consisting of polyallyl pentaerythritol, polyallyl sucrose and trimethylolpropane diallylether.

16. A process of claim 9 wherein said crosslinking agent is selected from the group consisting of polyallyl pentaerythritol, polyallyl sucrose and trimethylolpropane diallylether.

17. A process of claim 10 wherein said crosslinking agent is selected from the group consisting of polyallyl pentaerythritol, polyallyl sucrose and trimethylolpropane diallylether.

18. A process of claim 11 wherein said crosslinking agent is selected from the group consisting of polyallyl pentaerythritol, polyallyl sucrose and trimethylolpropane diallylether.

* * * * *

UNITED STATES PATENT AND TRADEMARK OFFICE
CERTIFICATE OF CORRECTION

PATENT NO. : 4,526,937
DATED : July 2, 1985
INVENTOR(S) : Chin Chien Hsu

It is certified that error appears in the above—identified patent and that said Letters Patent is hereby corrected as shown below: Title page:

Title reads "Polycarbonates Having Plasticizers With Fugitive Activity"

Should read -- Preparation of Carboxyl Containing Polymers --

Signed and Sealed this

Twenty-eighth Day of February, 1989

Attest:

DONALD J. QUIGG

Attesting Officer

Commissioner of Patents and Trademarks